United States Patent [19]
Roylance

[11] Patent Number: 5,982,612
[45] Date of Patent: Nov. 9, 1999

[54] APPARATUS FOR AUTOMATICALLY DEPLOYING A COMPUTER KEYBOARD INTO AN OPERATIVE POSITION FROM A STORAGE POSITION

[75] Inventor: William H. Roylance, Salt Lake City, Utah

[73] Assignee: Mallinckrodt & Mallinckrodt, Salt Lake City, Utah; a part interest

[21] Appl. No.: 08/878,274

[22] Filed: Jun. 18, 1997

Related U.S. Application Data

[62] Division of application No. 08/601,680, Feb. 15, 1996, abandoned.

[51] Int. Cl.[6] .............................. G06F 1/16; B41J 11/56; H05K 7/16
[52] U.S. Cl. .......................... 361/680; 400/489; 400/682
[58] Field of Search ...................... 361/680; 364/708.1; 341/22; 345/168; 400/479, 488–492, 682

[56] References Cited

U.S. PATENT DOCUMENTS

| | | |
|---|---|---|
| 3,749,947 | 7/1973 | Kawada et al. . |
| 3,940,758 | 2/1976 | Margolin . |
| 4,879,698 | 11/1989 | Landberg . |
| 5,141,343 | 8/1992 | Roylance et al. ...................... 400/472 |
| 5,187,644 | 2/1993 | Crisan ..................................... 361/680 |
| 5,267,127 | 11/1993 | Pollitt ..................................... 361/680 |
| 5,457,453 | 10/1995 | Chiu et al. .............................. 341/22 |
| 5,502,460 | 3/1996 | Bowen .................................... 345/168 |
| 5,519,569 | 5/1996 | Sellers . |
| 5,532,904 | 7/1996 | Sellers .................................... 361/680 |
| 5,539,615 | 7/1996 | Sellers . |
| 5,541,593 | 7/1996 | Arsem ..................................... 341/22 |
| 5,687,058 | 11/1997 | Roylance ................................ 361/680 |
| 5,712,760 | 1/1998 | Coulon et al. ......................... 361/680 |

FOREIGN PATENT DOCUMENTS 2618720  11/1976  Germany .

OTHER PUBLICATIONS

"Input Devices—How to Interact with Your PC" published by Harris Publications of New York, New York in their Winter 1996 Computer Buyer's Guide.

*Primary Examiner*—Lynn D. Feild
*Attorney, Agent, or Firm*—Mallinckrodt & Mallinckrodt

[57] ABSTRACT

A method and apparatus is described for automatically deploying to an operative position a keyboard where the width of the keyboard has been reduced. The invention is applicable to keyboards of portable computing devices of the type commonly incorporating a processor, a display and a keyboard system. The apparatus has a first and a second keyboard section, propelling device for driving the keyboard sections from the storage position to the operative position, latching apparatus for retaining the second keyboard section in operative position, and signaling apparatus for communicating signals from the first keyboard section to the processor.

12 Claims, 10 Drawing Sheets

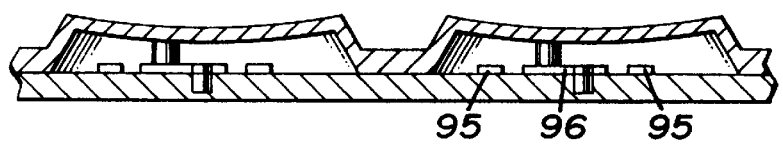
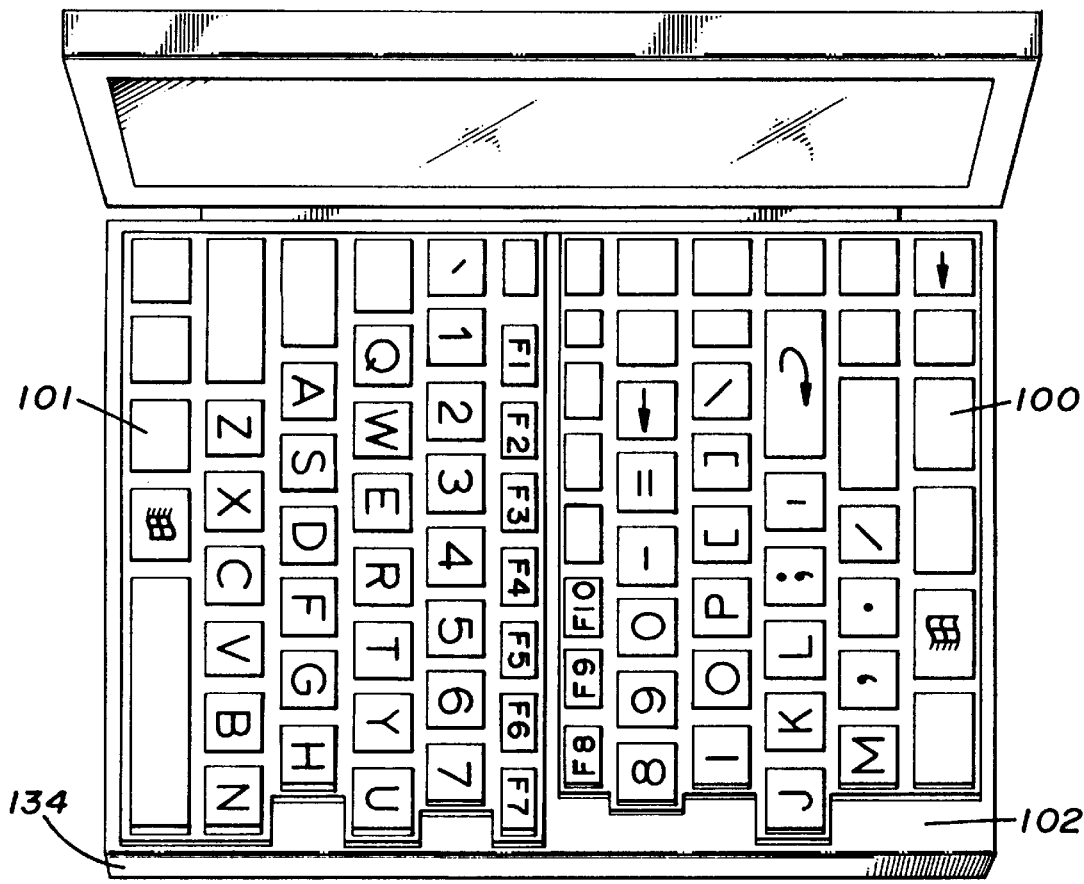
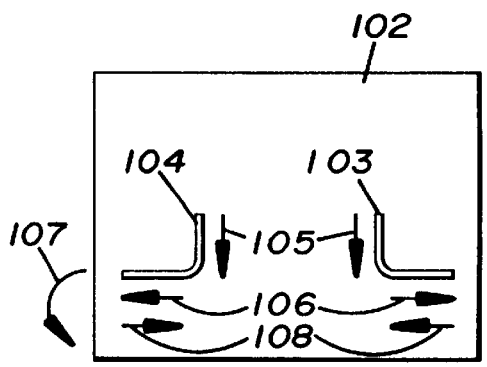
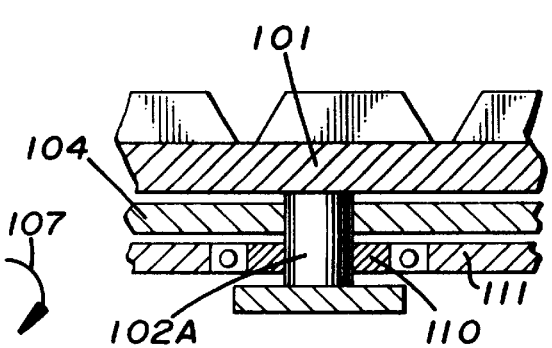

ial computing device. In this invention, several keyboard

APPARATUS FOR AUTOMATICALLY DEPLOYING A COMPUTER KEYBOARD INTO AN OPERATIVE POSITION FROM A STORAGE POSITION

This is a division of application Ser. No. 08/601,680, filed Feb. 15, 1996, now abandoned.

BACKGROUND OF THE INVENTION

1. Field of the Invention

The invention relates to methods and apparatus for reducing a dimension of a computer keyboard for storage or transport. The invention specifically relates to automatically opening a keyboard that folds into a small space for storage, such as that space available in a notebook or subnotebook computer.

2. The State of the Art

Manual typewriters had keyboards having large, widely spaced, keys to allow room for the mechanism of the typewriter and to allow users to strike the keys with the force required to actuate the mechanism.

Many features of todays computer keyboards are traceable to the characteristics of manual typewriters. Among these features are the QWERTY key layout and the size and spacing, of the keys. Many users of computer keyboards were trained on typewriters, or on computer keyboards incorporating the characteristics of typewriter keyboards. When these users purchase portable computers, they strongly prefer to purchase computers having a keyboard that, when in use, has similar key spacing, key size, and layout to the standard-size keyboards on which they were trained. These users also prefer to purchase computers with keyboards having keys that provide tactile feedback to the user, thereby assisting the user to properly position the fingers and exert appropriate keystroke force, such as keys that move over a distinct range that can be felt by users.

The standard QWERTY key layout of the alphabetic section of keyboards has a staggered arrangement of keys. The keys in the bottom row, "ZXCVBNM,/", do not line up with the keys in the second row, "ASDFGHJKL;'", which do not line up with the keys in the third row, "QWERTYUIOP[ ]", or those in the fourth, "1234567890-=\" row. This staggered arrangement was dictated by the needs of mechanical typewriters, where each key was often attached to a separate lever, with all levers arranged in a single row. With typical key-modifier keys located at the ends of the key rows, a standard alphabetic keyboard section requires a space at least 10.5 inches by 3.5 inches.

Modern electronics allows production of portable computing devices that are smaller than standard size keyboards. For example, the Hewlett-Packard 95 series of portable computers, and many electronic organizers such as those by Casio, are portable computing apparatus too narrow for standard size, 10.5 inch or larger, conventional QWERTY keyboards. These machines often have keyboards with small, tightly spaced, keys that do not lend themselves to fast typing by users trained on standard keyboards.

U.S. Pat. No. 5,141,343, issued to me in August of 1992, describes a linearly compressible keyboard wherein the key pitch is reduced to permit storage of a full-sized keyboard in a smaller space than the 10.5 inches of a standard keyboard.

U.S. Pat. No. 5,187,644, issued to Crisan in February, 1993, describes a notebook computer wherein the keyboard has a pair of hinged flaps. These flaps hinge above the top of the key array, and fold inwardly. The flaps are supported when in use by foldout keyboard supports that extend from each flap to notches on the side of the computer body. The flaps of Crisan have numeric pad and function keys, with the alphabetic keys remaining in a center section. Crisan fails to disclose apparatus for automatically deploying his keyboard from the storage position into the operational position.

U.S. Pat. No. 5,267,127, issued to Pollitt in November of 1993, describes a keyboard fabricated in two sections, equivalent to a keyboard cut through the QWERTY section of the keyboard. These sections are pivoted together at the top of the keyboard. The pivot joint slides in a track on the upper surface of the notebook computer. For use, the sections are aligned to form an array like a standard keyboard, with the pivot slid to the rear of the computer. For storage, the sections remain in the same plane, each rotated ninety degrees with the pivot slid to the front of the computer top. Pollitt fails to disclose apparatus for automatically deploying his keyboard from the storage position into the operational position.

U.S. Pat. No. 3,940,758, issued to Margolin in February of 1976, describes a keyboard for a calculator that is fabricated in three sections. The Margolin keyboard includes a QWERTY section that is divided into two portions. Each section of Margolin's keyboard has an electrical connector that mates with the adjoining section when the three sections are arranged in line in operative position. The sections of Margolin are interconnected by a linkage. This linkage permits the keyboard sections to be separated, and stacked vertically. Margolin, does not suggest that the keys of the sections be retained by a latch in compressed position for storage, and does not disclose automatic deployment of the keyboard into operative position.

IBM has introduced the Thinkpad model 701C notebook computer. This computer has a keyboard divided into a first and a second section along a line having the appearance of a stairstep. A horizontal dimension of the keyboard is reduced for storage by shifting the second section of the keyboard backwards relative to the first section until its keys clear the adjacent steps of the first section, whereupon the second section is shifted horizontally to reduce the overall horizontal dimension of the keyboard. Both sections of the keyboard move relative to the computing device case, extending equally beyond the case in operative position, while fitting within the case in storage position. When the keyboard is deployed for operation, the second section is shifted in a reverse order and direction relative to the first section. The two sections of keyboard remain in the same plane in both storage and operative positions. Shifting of the second keyboard section relative to the first keyboard section is driven by a linkage coupled to the lid hinge, such that as the lid is raised the keyboard is deployed and as the lid is lowered the keyboard is moved to storage position. The inventor believes that no motors or springs are used to deploy the keyboard of the Thinkpad 701C, and is unaware of any latches for retaining the keyboard sections of the Thinkpad in operative position.

Thicknesses of keyboards from key tops to the bottom of the keyboard vary, but is frequently greater than a centimeter. Key travel, the distance that a key moves when pressure is applied, is usually from two to four millimeters, with 2.5 to 3.5 millimeters being common.

U.S. Pat. No. 4,879,698, issued to Langberg in 1989, teaches a polymeric piezoelectric actuator usable for producing vibrations in the 250–300 Hz range that may be felt with the fingertips.

SUMMARY OF THE INVENTION

A keyboard of standard width is comprised of several keyboard sections folded to require less width in a portable computer case for storage than a standard width one piece keyboard. The keyboard system also comprises deployment apparatus being for driving the keyboard sections into operative position; the deployment apparatus operative whenever a user opens the portable computer.

The self-deploying keyboard may be constructed with conventional keys having a substantial key travel to provide tactile feedback, such as those keyboards using plastic keytops interacting with a membrane having carbon pill contacts, or those having magnetic keytops and Hall-effect key-motion sensors. When so implemented, the key travel may optionally be taken up for storage. For improved compactness, the self-deploying keyboard may also be constructed with adjustable pressure sensitive keys having piezoelectric actuators that vibrate the keys to provide tactile feedback to the user.

BRIEF DESCRIPTION OF THE DRAWINGS

The best mode presently contemplated for carrying out the invention is illustrated in the accompanying drawings, in which:

FIG. 13, a partial vertical section of a keyboard having nonmoving keys and piezoelectric feedback;

FIG. 14a, a perspective view of a third alternate embodiment the keyboard in storage position having a two section keyboard having pivoted sections that move in L-shaped tracks on the top of the computer case;

FIG. 14b, a schematic view of the L-shaped tracks and keyboard motions of the embodiment of FIG. 14a;

FIG. 14c, a partial vertical section taken through the pivot of the embodiment of FIG. 14a;

FIG. 14d, a schematic of the arrangement of the tracks, drive belt, and worm of the embodiment of FIG. 14a;

DETAILED DESCRIPTION OF THE ILLUSTRATED EMBODIMENTS

Figure 1:
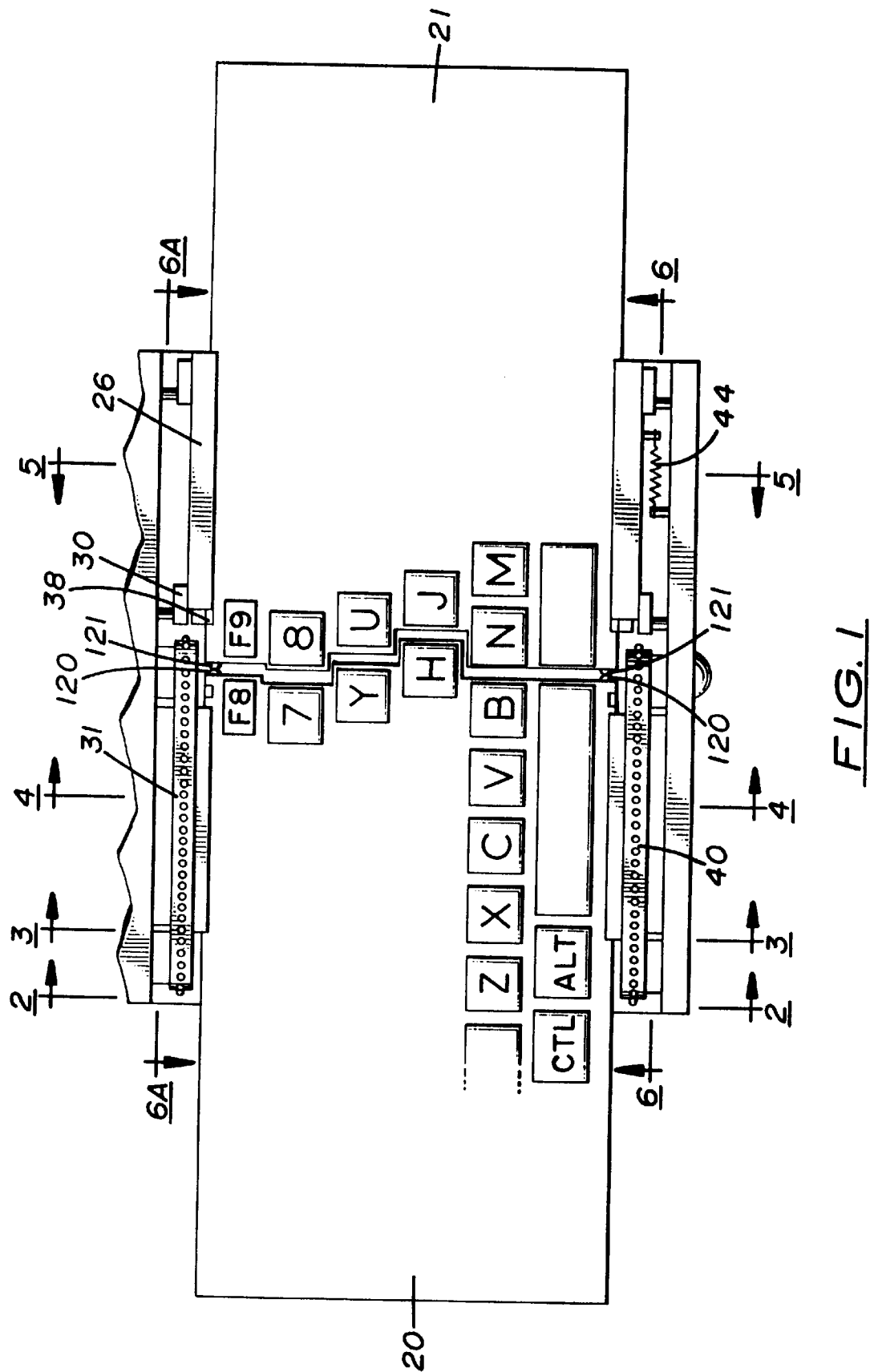
FIG. 1 is a partial top plan view of the preferred embodiment of the keyboard in operative position, partially cut away to show the pair of belts and carrier.
Figure 4:
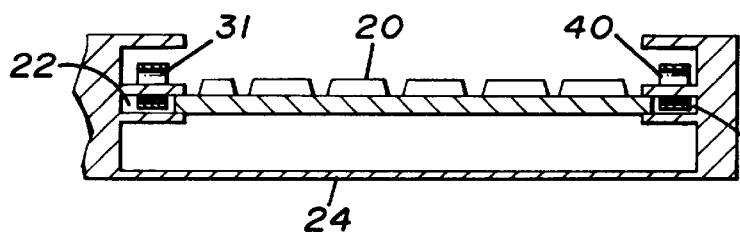
FIG. 4, a partial vertical section taken at 4—4 of FIG. 1.
Figure 5:
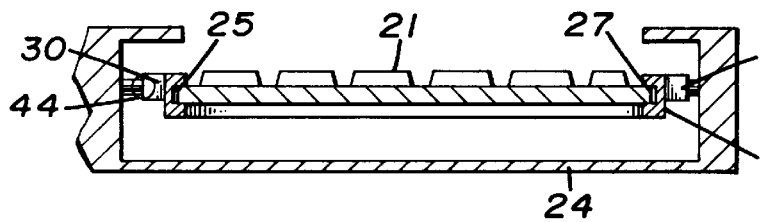
FIG. 5, a partial vertical section taken at 5—5 of FIG. 1.

A portable computing device incorporating the preferred embodiment of my keyboard system has a first keyboard sections 20 and a second keyboard section 21 (FIG. 1). The first keyboard sections is slidably engaged in a slot 22 (FIG. 4) at the rear of a computer case and a slot 23 at the front of the computer case 24. Similarly, second keyboard section 21 is slidably engaged in a slot 25 (FIG. 5) at the rear of a keyboard carrier 26, and a slot 27 at the front of the keyboard carrier 26.

Keyboard carrier 26 has an operative position wherein the second keyboard section 21 the section engaged to the keyboard carrier, 26 is at the same height as the first keyboard section 20 The keyboard carrier 26 also has a storage position, wherein the second keyboard section 21 engaged to the keyboard carrier 26 is at a different height than the first keyboard section 21. This height difference is such that the second keyboard section 21 may slide into a storage position wherein it is located above the first keyboard section, 20 and the first keyboard section may 20 slide into a storage position beneath the second keyboard section 21.

Figure 6:
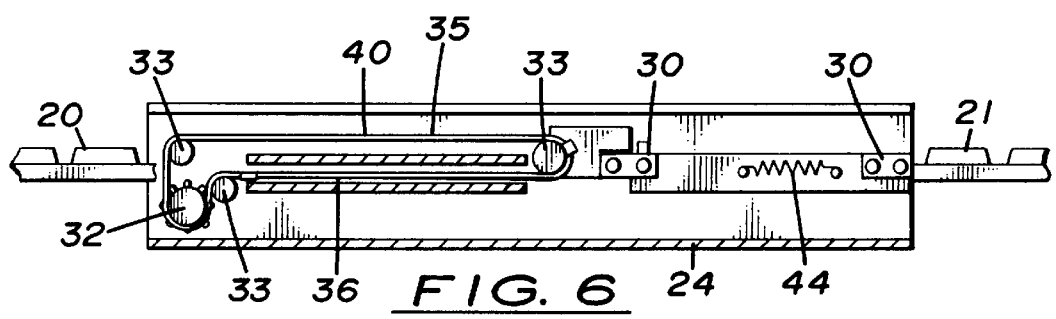
FIG. 6, a partial vertical section taken at 6—6 of FIG. 1.
Figure 6A:
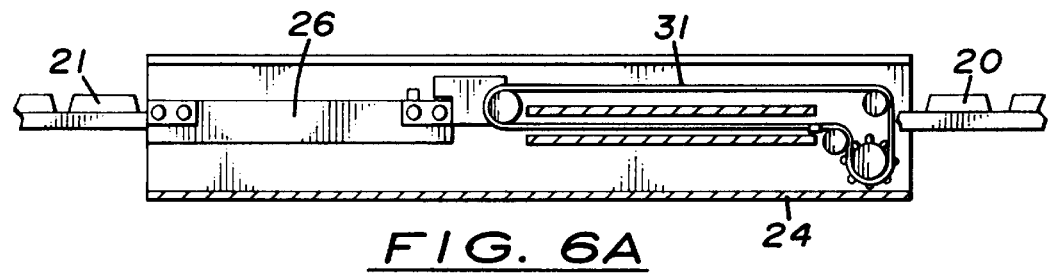
FIG. 6a, a partial vertical section taken at 6a—6a of FIG. 1.

The keyboard carrier 26 is mounted upon four rotatable cranks 30 (FIG. 6 and 6a), that rotate approximately 90 degrees as the keyboard carrier 26 is moved from the storage position into the lower or operative position. As a result, the keyboard carrier 26 shifts towards the left-hand side (FIG. 6) of the computer case as well as changing height when moved from the operative position to the storage position.

My keyboard system also has a belt 31 that passes in a loop over two or more pulleys, including a drive pulley 32 and idler pulley 33. Belt 31 is preferably a perforated belt through which projections on the drive pulleys engage. A cog—type belt having indentations on the inner surface engaging projections upon the drive pulley, or a belt having teeth along the sides engaging projections upon the drive pulley, will also serve. The belt has an upper portion 35 on about the same plane as the storage position of the second keyboard section, and a lower portion 36 on about the same plane as the first keyboard section 20. The first keyboard section 20 is engaged or tied with the lower portion 36 of the belt. The second keyboard section 21 is also engaged with or tied to the belt, 31 such that when the second section 21 is in storage position it is engaged with what is the upper portion of the belt 35.

Rotation of the belt 31 drives the first and second keyboard sections 20 and 21 in opposite directions, from the storage position wherein the second keyboard section 21 is directly above the first keyboard section 20 to a point where little of the second keyboard section 21 is above the first keyboard section 20. An ear 38 upon the second keyboard section 21 thereupon engages with the keyboard carrier 26, forcing carrier 26 towards the right hand end of the computer case, thereby rotating the four cranks 30 that support the keyboard carrier, 26 and lowering the keyboard carrier 26 from the storage position into the operative position. Simultaneously with the lowering of the keyboard carrier 26 the attachment point of the second keyboard section 21 to the belt 31 is lowered as the attachment point of the belt rotates about the idler pulley 33.

Figure 2:
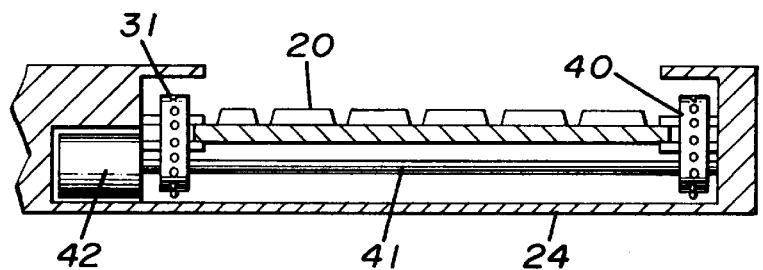
FIG. 2, a partial vertical section taken at 2—2 of FIG. 1, showing the electric deployment motor.

In order to prevent jamming and to ensure that the keyboard sections 20 and 21 and keyboard carrier 26 are firmly held in place during operation of the keyboard, the preferred embodiment of my keyboard incorporates a second belt 40, with idler 33 and drive pulleys 32 corresponding to those of the first belt 31. In order to ensure that the belts move synchronously, the drive pulleys 32 are keyed to a common axle 41 (FIG. 2) and driven by a common reversible DC electric motor having an integral reduction gear train 42.

Motor 42 is driven by a motor driving circuit (not shown) that is capable of sensing the current drawn by the motor. When the keyboard is deployed to operative position, the belts 31 and 40 are physically restrained from rotating further in the deployment direction thereby stopping or stalling the motor 42. Similarly there is a stop (not shown) that engages with and stops motion of the first keyboard section 20 when the keyboard is driven fully to the storage position, thereby restraining rotation of the belts 31 and 40. Motor 42 draws increased current when stalled, this increase of current is detected by the motor driving circuit which stops driving the motor 42 when the keyboard is fully deployed or is fully retracted into storage position.

Retraction of the keyboard from operative position into storage position is accomplished by operating the motor 42 in the reverse direction. As the belts 31 and 40 draw the keyboard sections 20 and 21 towards the storage position, a small spring 44 draws the keyboard carrier 26 in a direction such that the four cranks 30 rotate such that the carrier 26 is raised enough that the second keyboard section 21 can slide above the first keyboard section 20. The second keyboard section 21 thereupon slides into storage position such that it is located in a plane parallel to, but different from, the plane defined by the first keyboard section 20.

The preferred embodiment has keys that move only slightly downwardly when struck. These keys are pressure sensitive rather than motion sensitive, having pressure sensors 95 (FIG. 13) to sense key forces. Signals from the pressure sensors 95 are compared to an adjustable threshold value corresponding to an adjustable threshold pressure value at which a key-press will be detected, a key-press signal being produced when the pressure exerted by a user exceeds the threshold value. With this mechanism, adjustment of the threshold value alters the pressure that must be exerted on a key before a key-press is detected.

The pressure sensitive keys are formed with a concave upper surface and steep sides so that when not struck they feel similar to keys of typical computer keyboards. When struck, the keys do not move downwardly enough to provide tactile feedback to the user, so tactile feedback is provided by a piezoelectric transducer 96 beneath each key that vibrates the key at a frequency where human fingertips are sensitive to vibratory motion, such as in the frequency range of from 250 to 300 Hz. It may also be possible to couple each key to an actuator that would provide a kickback motion to the key when the key is pressed and the keypress is detected.

In a first alternate embodiment of my keyboard (FIG. 7), a spring 60 (FIGS. 8a and 8b) is provided to propel a first 61 and a second 62 keyboard section from storage position into operative position instead of the reversible D.C. electric motor of the preferred embodiment. The second keyboard section 62 engages in slots in a keyboard carrier 63 as with the preferred embodiment, and the first keyboard section engages in slots (not shown) in the computer case, also as with the preferred embodiment. A single belt 64 similar to the belts 31 and 40 of the preferred embodiment is provided for driving the keyboard sections 61 and 62. As with the preferred embodiment, the second keyboard section 62 is fitted with an ear 65 that engages the keyboard carrier 63 to force the carrier sideways, thereby rotating the cranks 66 upon which the keyboard carrier 63 is supported to lower the carrier 63 into the operative position. Also similarly to the preferred embodiment, the carrier 63 is fitted with a small spring 67 for returning the carrier to the storage position.

The first alternate embodiment is further fitted with a release catch 68 that is attached to the computer case which engages the second keyboard section 62 and is actuated by a lever (not shown) operated by a lid (not shown) of the computer case. This release catch 68 is devised such that the catch 68 disengages from the second keyboard section 62 when the lid is fully open, but engages with the second keyboard section 62 when the lid is partially open. It is recognized that a release catch engaging with the first keyboard section 61 will also suffice.

Since one belt 64 driven by a spring 60 does not adequately retain the keyboard sections 60 and 61 in the operative position when the keyboard is in use, the first alternate embodiment also has first and second and second spring-loaded catches 70 and 71 for retaining the keyboard carrier 63 and thereby the keyboard sections 61 and 62 firmly in place while the keyboard is in use.

Figure 9:
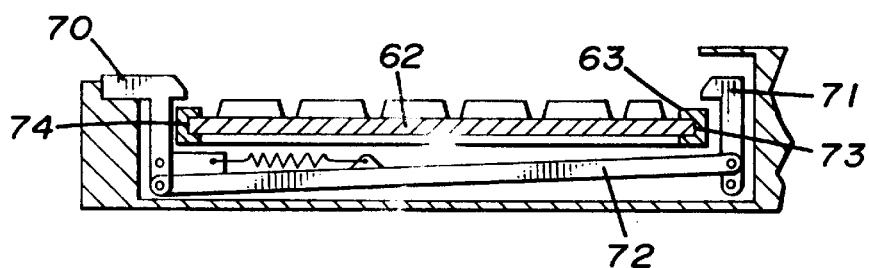
FIG. 9, a partial vertical section taken at 9—9 of FIG. 7.

The first catch 70 (FIG. 9) has a thumb tab such that the catch may be released by a user when it is desired that the keyboard sections be repositioned from operative to storage position. The first catch 70 is fitted with an actuating lever 72 such that releasing the first catch 70 simultaneously releases the second catch 71, thereby releasing the carrier 63. A user folding the keyboard into storage position therefore begins by partially closing the lid of the computer such that the release catch 68 will engage the second keyboard section 62 and retain the keyboard closed when the folding operation is complete. The user then presses the distal ends of the first second keyboard sections 61 and 62 towards each other, which removes any pressure of the ear 65 on the carrier 63, thereby permitting the carrier spring 67 to rotate the cranks 66 and return the carrier 63 to the storage position, whereupon the second keyboard section 62 slides above the first keyboard section 61 into storage position, and the release catch 68 engages, as in FIG. 10.

The keys of the alternate embodiment have a key travel, or distance that the key moves when struck, of about two millimeters.

Figure 10:
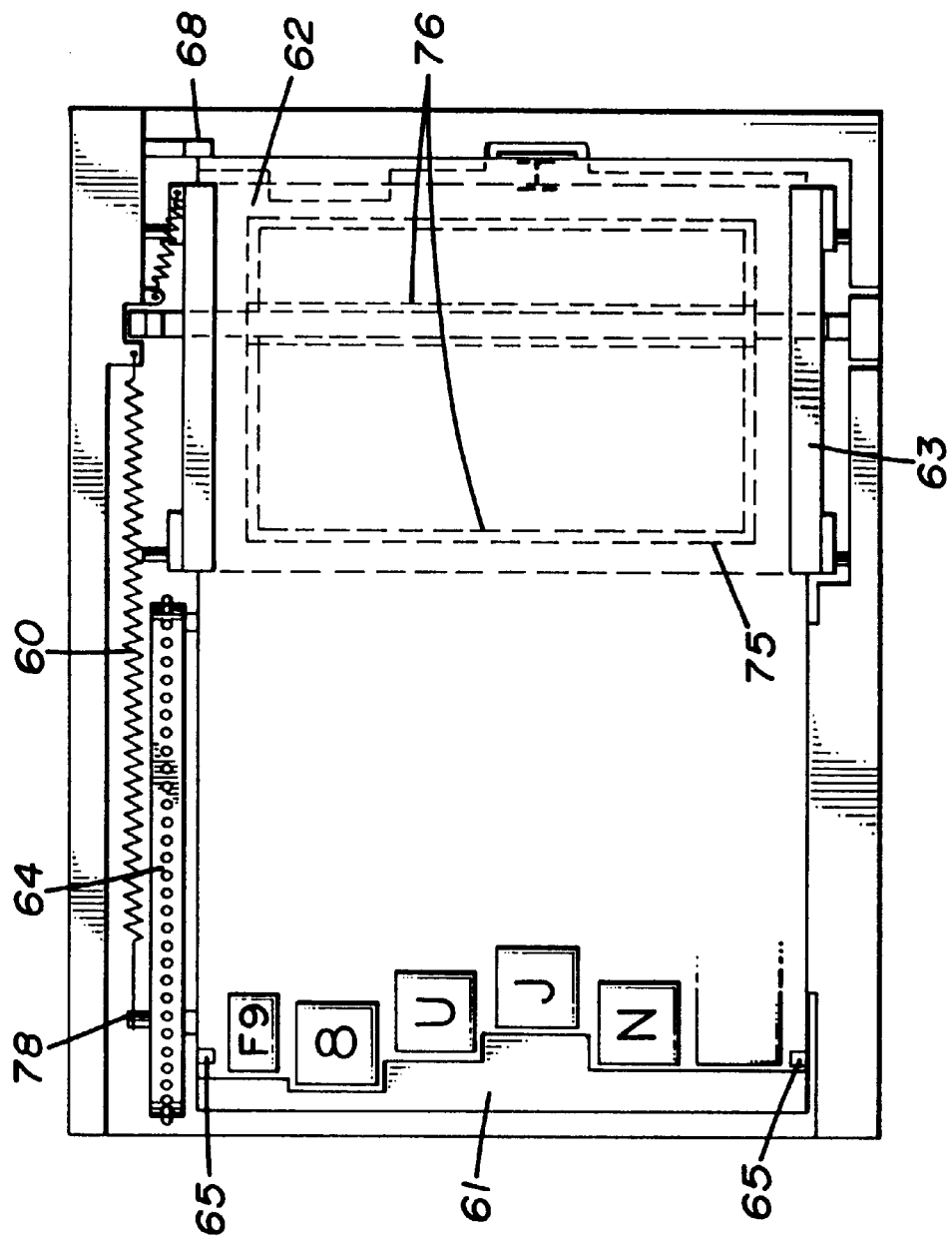
FIG. 10, a top plan view of the embodiment of FIG. 7, showing the keyboard in storage position.

While it is necessary that the second keyboard section 62 be firmly retained in position while in operative position, play is permissible when it is in other positions. Retention slots 73 and 74 in the keyboard carrier 63 are wide enough to allow play about equal to the distance that keys move when struck (the key travel). Keyboard carrier 63 is formed with at least one hole 75 in the flat bottom surface beneath the second keyboard section (FIG. 10). At least one projection 76 is formed in the surface of the computing device case that lies under the keyboard carrier 63 and located such that when the keyboard carrier 63 is latched in the operative position the projections 76 fit through the hole 75 in the bottom of the keyboard carrier, such that the second keyboard section 62 is firmly clamped by the upper surface of the projection 76 and the upper portion of the retention slots 73 and 74 in the keyboard carrier 63. Projection 76, which contains the battery of the portable computing device, is formed such that the first keyboard section 61 can be retracted over it.

The keys of the first keyboard section 61 are formed with a sloping side such that as the second keyboard section 62 is retracted, the second section 62 is deflected upwardly in the retention slots 73 and 74 and fits over the first section 61. When the keyboard is fully retracted into storage position, and the lid of the computing device is closed, the lid applies pressure to the keys of the second, section 62 of the keyboard thereby taking up the key travel of the second section 62 and forcing the second section 62 downwardly in the retention slots 73 and 74 of the keyboard carrier 63 such that the second section 62 applies pressure to the keys of the first section 61 of the keyboard thereby taking up the key travel of the first section 61. The lid is retained in closed position by another latch (not shown).

Figure 7:
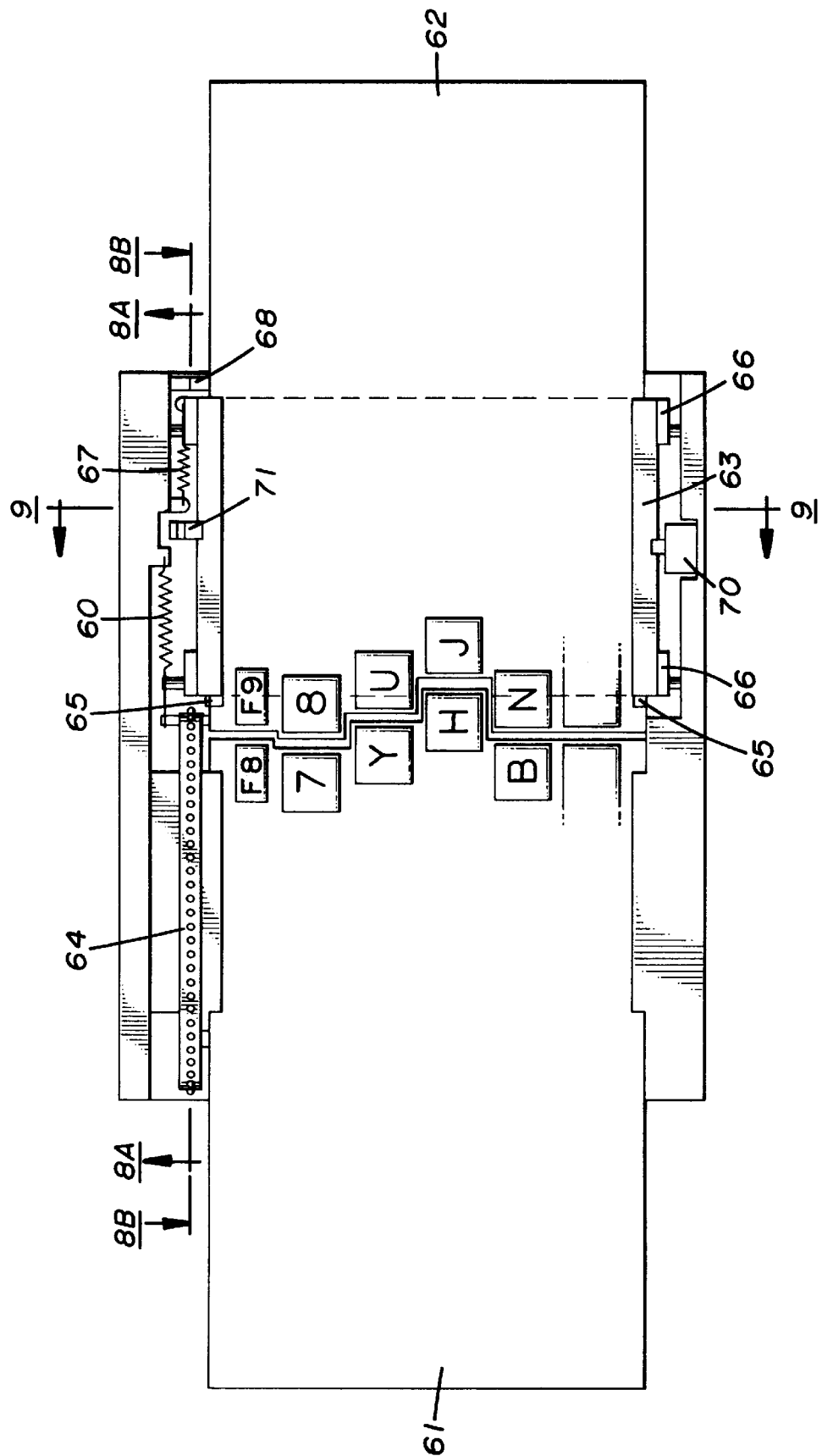
FIG. 7, a top plan view of a first alternative embodiment of the keyboard in operative position, partially cut away to show the single belt and deployment spring.
Figure 8A:
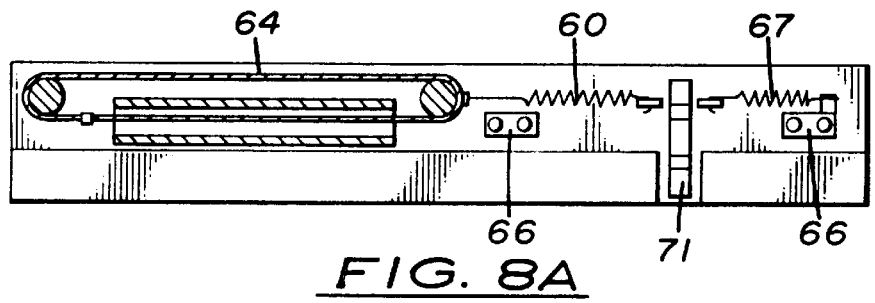
FIG. 8A, a vertical section taken at 8a—8a of FIG. 7, showing parts towards the rear of the keyboard.
Figure 8B:
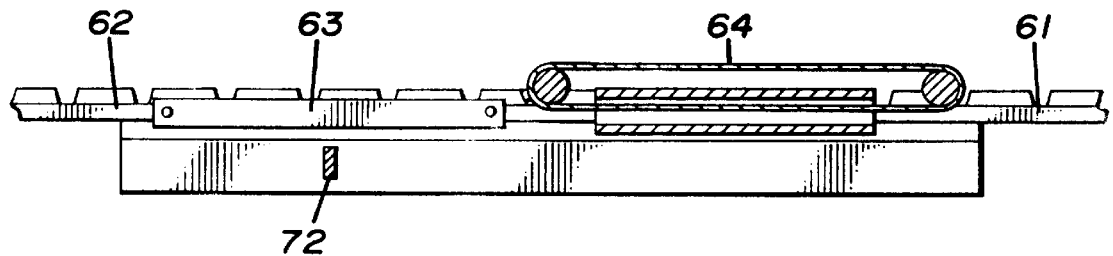
FIG. 8B, a vertical section taken at 8b—8b of FIG. 7, showing parts towards the front of the keyboard.

While in the first alternate embodiment of FIG. 7 the deployment spring 60 is portrayed as engaging the belt 64 through a clip 78, the device will function if the first keyboard section 61 is driven by a spring, such as a spring located beneath the keyboard. Similarly, a pinion and dual rack arrangement may adequately couple and reverse the directions of motion of the keyboard sections.

Figure 11:
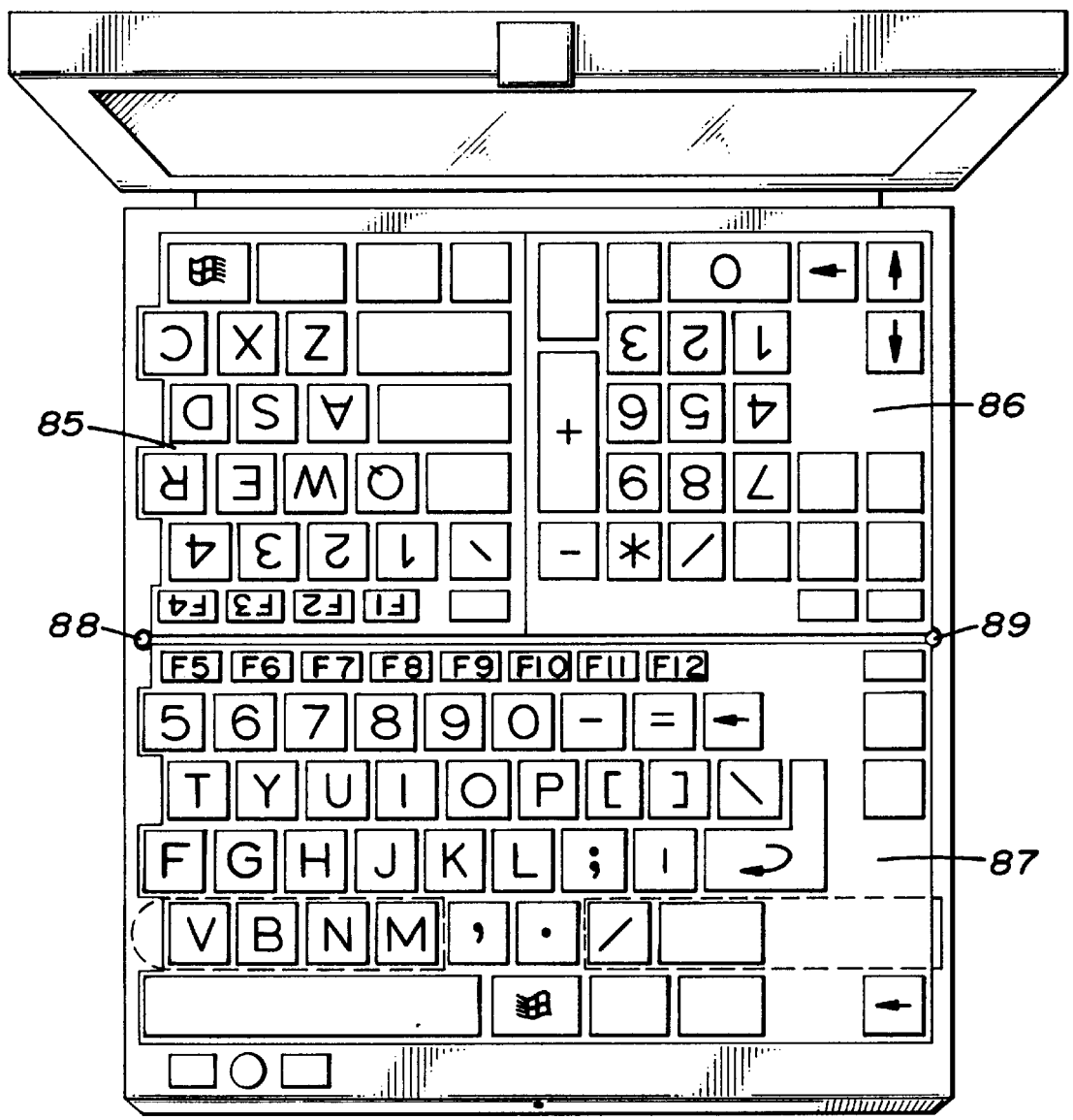
FIG. 11, a perspective view of a second alternate embodiment of the keyboard having three keyboard sections, two of which are mounted with a pivot, showing the keyboard in storage position.
Figure 12:
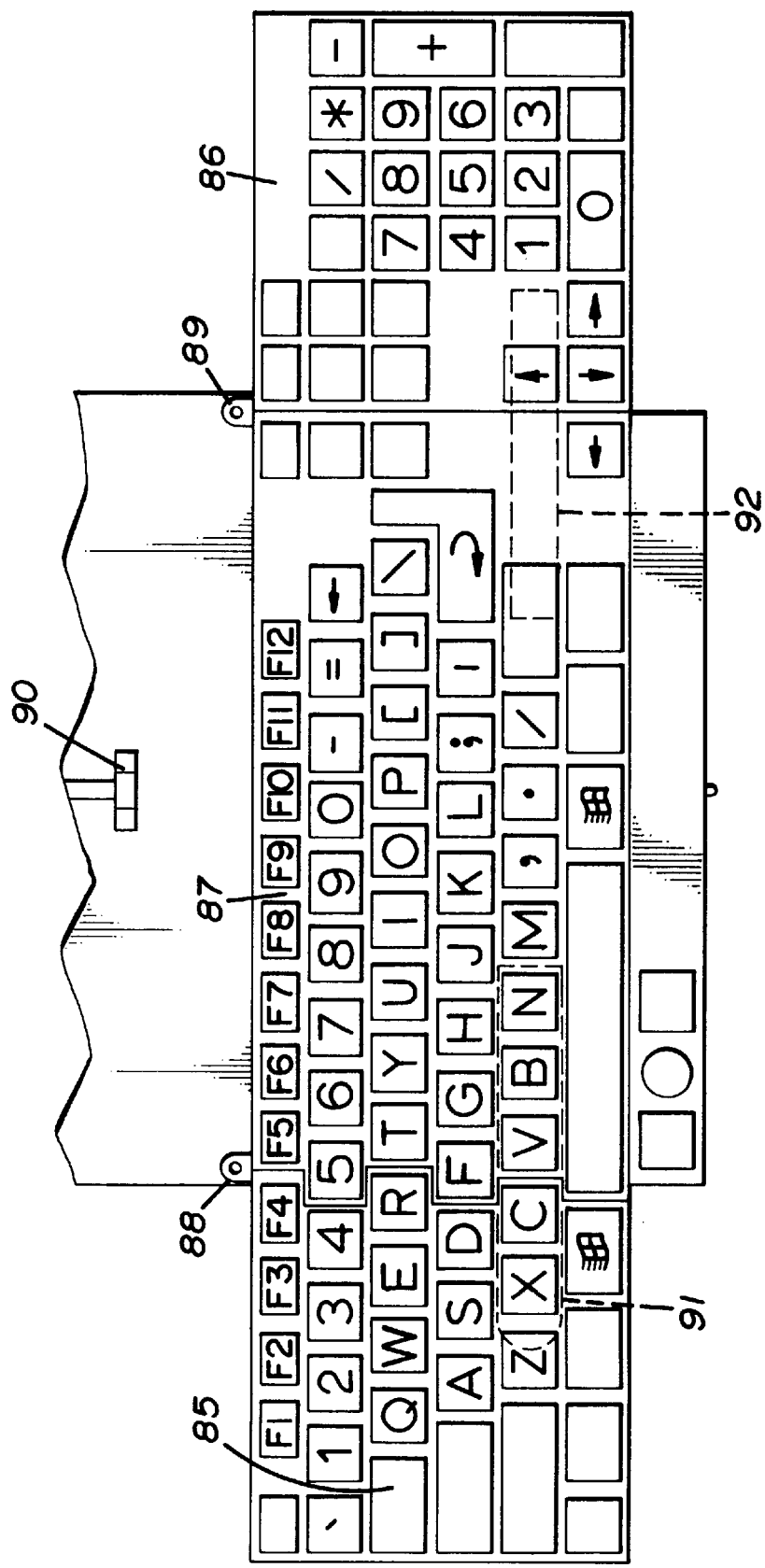
FIG. 12, a partial top plan view of the embodiment of FIG. 11, showing the keyboard deployed into operative position.

A second alternative embodiment has three keyboard sections (FIG. 11), a first pivoting section 85, a second pivoting section 86, and a fixed section 87. The pivoting sections 85 and 85 of this embodiment are rotated into a position behind the fixed section 87 for storage, as depicted in FIG. 11. The pivoting sections 85 and 86 of this embodiment are rotated into a position in line with the fixed section 87 when the keyboard is deployed to operative position, as depicted in FIG. 12. The portable computing device is approximately nine by ten inches when folded into storage position, but about sixteen and a half inches wide when deployed into operative position.

In this second alternative embodiment, the pivot 88 of the first pivoting section 85 and the pivot 89 of the second pivoting section 86 are spring-loaded. A catch 90 retains the first and second pivoting sections 85 and 86 in the storage position. The catch 90 is released when the lid of the computing device is raised past a threshold; whereupon the springs (not shown) of the spring loaded pivots 88 and 89 drive the pivoting sections 85 and 86 into operative position.

The pivoting sections 85 and 86 of this embodiment are supported upon a pair of sliding support members 91 and 92, that slide laterally outwardly beneath the respective pivoting sections to provide support for the sections.

When the boundary between pivoting section 85 and the fixed section 87 occurs in the QWERTY section of the keyboard as illustrated, the boundary must have crenelations as shown to allow for the staggered arrangement of keys in a standard QWERTY layout while permitting the key to key spacing of adjacent keys on different sections to remain that of a standard keyboard. Ordinarily the merlons of each section would strike each other as the sections rotate. The crenels and merlons of each section are therefore beveled so that the merlons of the pivoting section 85 clear the merlons of the fixed section 87, fitting in crenels of the fixed section, as the pivoting section rotates into or out of operative position. Alternatively, the crenels may be made wide with respect to the mating merlons, or enough play must be provided to allow a final closing movement more approximating a straight line than the arc described by the distance from the pivot to the merlon. Such play may be acheived through use of an elastomeric pin or ring (not shown) in the pivoted joint.

A third alternative embodiment has two sections 100 and 101 (FIG. 14*a*), each attached via a sliding pivot 102*a* to tracks on the top of the computer case 102. The first section 100 is attached to an L-shaped track 103, and the second section 101 to a reverse-L track 104 (FIG. 14*b*). In deploying the keyboard sections from the storage position illustrated in FIG. 14*a*, the keyboard section 100 and 101 they are first moved towards the front 105, then outwardly away from each other 106. This motion provides room for the keyboard sections 100 and 101 to rotate ninety degrees such that the staggered edges align, and then move towards each other 108, into the position shown in FIG. 15.

Figure 14D:
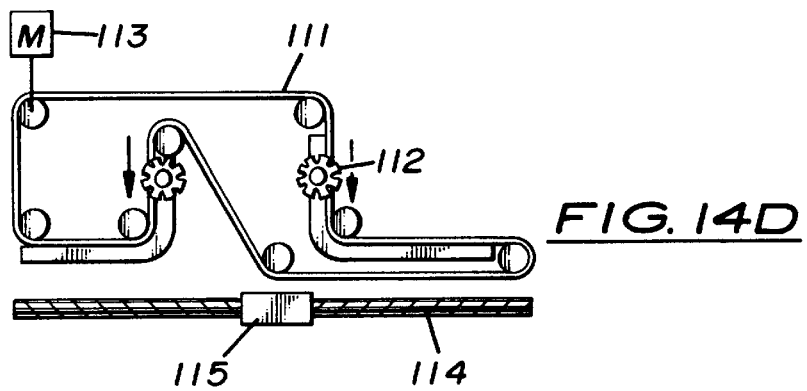
Figure 15:
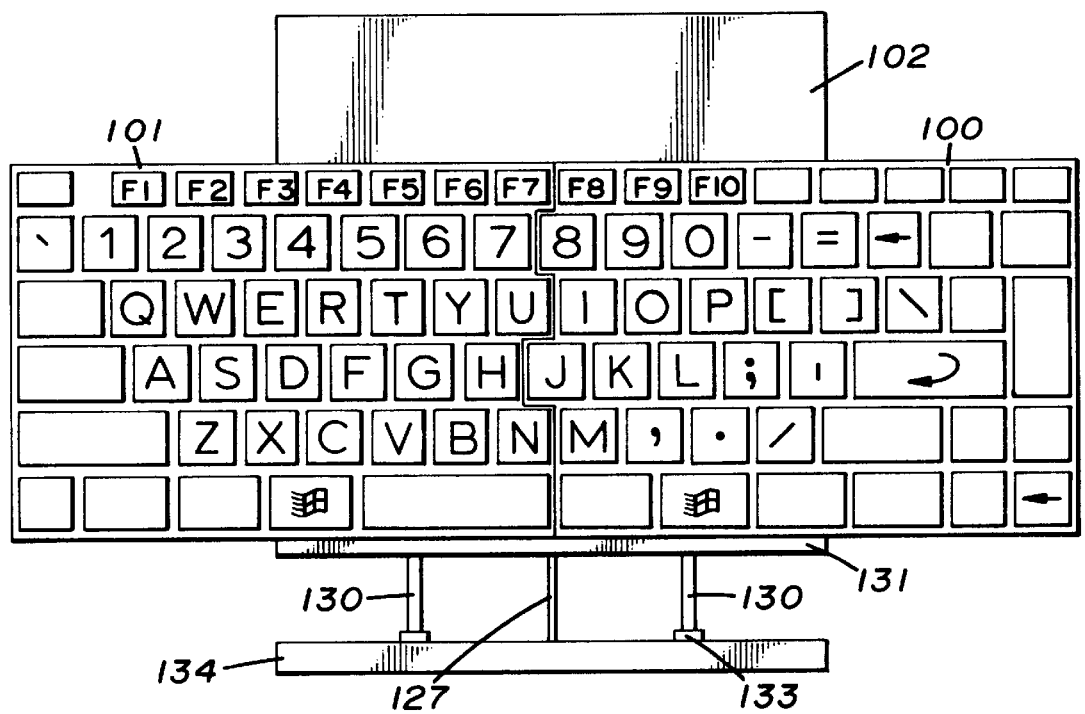
FIG. 15, a partial top plan view of the embodiment of FIG. 14a having the keyboard sections in operative position.

Each pivot 102*a* is attached through a bearing 110 to a belt 111 and is fixed to a gear 112 (FIGS. 14*c* and 14*d*). The belt is driven by a motor 113, and is wrapped over a plurality of idler wheels such that motion of the belt 111 in a first direction drives both keyboard sections towards the front 105 and then outwardly 106, while motion of the belt in a second direction drives both keyboard sections inwardly, and then towards the rear of the case.

When the keyboard sections are driven towards the front 105 and reach the bend of the L, as the respective pivots 102*a* move around the track 103 and 104 to begin outward movement 106 the gear 112 of each pivot engages a grooved rod 114 having right-hand grooves on a first end and left-hand grooves on the other. As the keyboard sections 100 and 101, are constrained from rotating initially, and the rod 114 is free to turn, the rod 114 revolves but the keyboard sections 100 and 101 do not. When the keyboard sections 100 and 101 near the outward end of the respective track 103 and 104, a brake 115 stops revolution of the rod 114. As the pivots 102*a* continue moving outwardly 106 the gears 112 rotate the pivots 102*a*, thereby rotating the respective keyboard section 100 and 101. The keyboard may be stopped in a partially rotated position (not shown) when desired by a user, or rotation may continue through a full ninety degrees for each section. The brake is released for the short inbound stroke 108, permitting the rod 114 to rotate and allow the keyboard sections 100 and 101 to mate without further rotation. The sequence of events is reversed when the keyboard is folded for storage.

Figure 16:
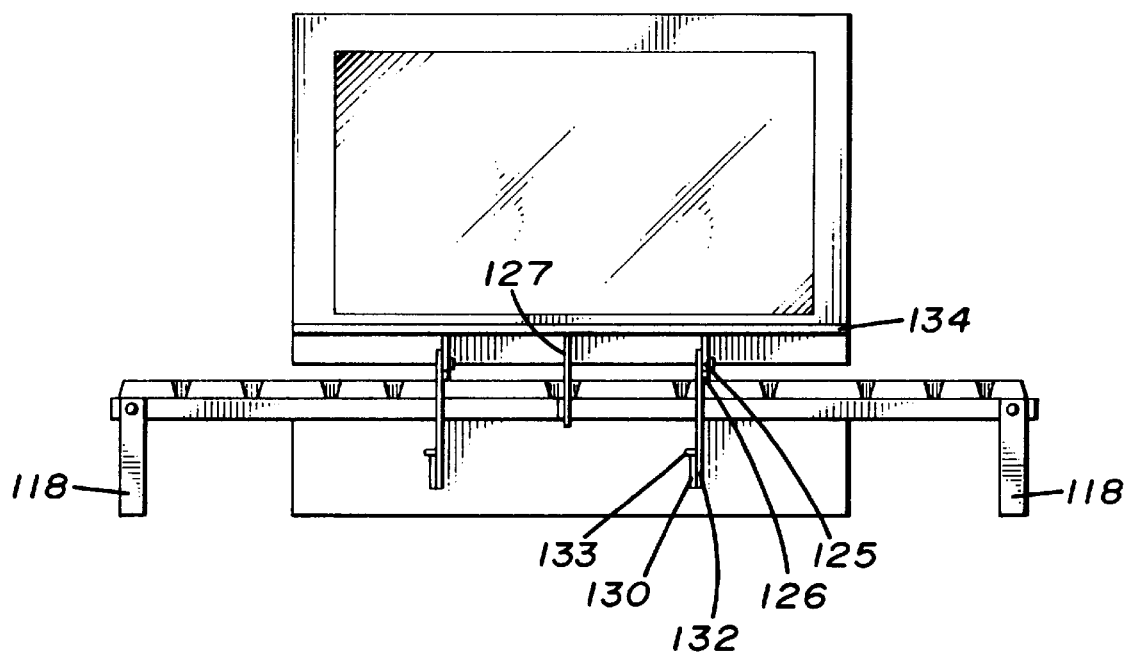
FIG. 16, a frontal view of the optional fold-down keyboard wing supports.

While it is expected that the several embodiments described will operate successfully for most users, some users who strike keys with particularly high forces may require additional support for the ends of the keyboard while it is in operative position. These embodiments may therefore be fitted with optional pivoting keyboard supports 118 (FIG. 16). This support 118 is pivotally attached at the outboard tip of each of the first and second keyboard sections, and may be folded downwardly by the user to extend to a supporting surface such as a table to provide additional stability to the keyboard in a manner similar to that of the wingtip wheels of the B-52 and B-36 "bicycle gear" aircraft. While a single support 118 at the outboard end of each keyboard section may be adequate, it is preferred that a pair of pivoting keyboard supports 118 be fitted at the outboard end of each section, one at the corner nearest the user and one at the corner furthest from the user. These supports 118 have a position in which they extend downwardly from the keyboard sections to a point level with a bottom of the portable computing device, such that when the portable computing device is placed upon a sufficiently large table they extend from the keyboard sections to the table.

Where the keyboard carrier of the first and second embodiments has been described as mounted upon cranks, it is recognized that the carrier may be mounted on pins sliding in a curved track. The sliding motion of the pins in the curved track will serve to convert the outward kinetic energy of a second keyboard section having an ear engaging the keyboard carrier into a downward motion of the carrier in a manner similar to that of the cranks.

While the keyboard carrier of the first and second embodiments raises the second keyboard section for storage above the first keyboard section, it is recognized that it is possible to reverse the action with the second keyboard section stored beneath the first keyboard section. When the keyboard is deployed into operative position, the first keyboard section shifts horizontally to operative position. The second keyboard section shifts horizontally to a position clear of the first section, and then rises and is latched into operative position adjacent to the first section.

It is recognized that the keys having key travel of the first alternative embodiment can be combined with the remainder of the preferred embodiment to create an embodiment in which the key travel is taken up by closing the lid. This embodiment may also have the loose keyboard carrier retaining slots and projections of the alternative embodiment, such that part or all of the key travel of the first keyboard section may be taken up for storage.

Each keyboard section must communicate keystroke information to the processor of the portable computing device. This data may be transmitted directly, or indirectly through another keyboard section. Since the operative position of each keyboard section is known, it is possible to incorporate a small battery in each section and transmit the information optically.

Figure 3:
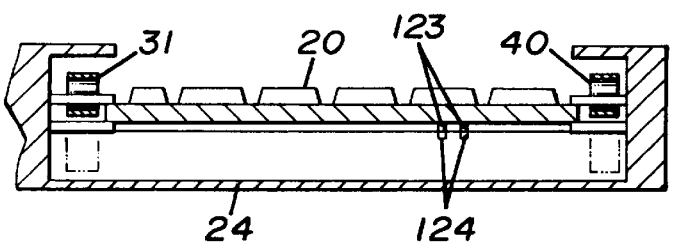
FIG. 3, a partial vertical section taken at 3—3 of FIG. 1.

The preferred embodiment has a pair of contacts 120 (FIG. 1) on the first section 20 of the keyboard, and a pair of contacts 121 on the second section 21 of the keyboard that connect the second section 21 of the keyboard to the first section 20 when the keyboard is in operative position. These contacts 120 both convey power from the first section 20 to the second section 21 and data signals from the second section 21 to the first section 20 of the keyboard. A similar set of contacts 123 (FIG. 3) on the first section 20 of the keyboard 123 mating with contacts 124 on the bottom portion of the case containing the processor conveys information power to the keyboard, and data from the keyboard to the processor (not shown) located within the case.

Where electric motors and springs coupled to keyboard sections through belts and pulleys or through a spring-loaded hinge have been shown herein as propelling apparatus for deploying keyboard sections into operative position, other forms of propelling apparatus may also serve. For example, an electric motor may be coupled through gears to impart deploying motion to keyboard sections. Further, an elastomeric material or a pneumatic or hydraulic cylinder or bladder may serve as propelling apparatus in place of springs.

Figure 15A:
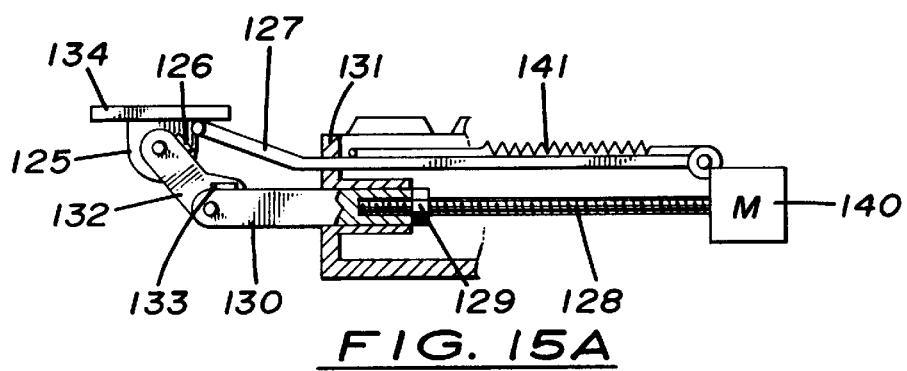
FIG. 15a, a partial vertical view of the embodiment of FIG. 14a showing details of the retractable palmrest.

It is also recognized that the various embodiments of the keyboards described herein may be combined with a digital computing device having a palmrest area. Such a palmrest area may be an area of an upper surface of the computing device, or may be a folding element that extends automatically upon deployment of the keyboard into operative position. Upon opening the portable computing device, a pair of first palmrest supports 130 (FIGS. 15 and 15a) move to extend outward in operative position from the front of the computer case 131. Attached to the first palmrest supports 130 is a pair of second palmrest supports 132, each having a stop 133. The second palmrest supports 132 are attached to the palmrest 134 by a pair of brackets 125, each of which also has a stop 126. The stops 133 of the second palmrest supports 132 are held against the first palmrest supports 130, and the stops 126 of the brackets 125 are held against the second palmrest supports 132 in deployed position slightly above the plane denoted by the operative position of the keyboard by a palmrest tensioning cable 127.

The palmrest 134 is moved to retracted position (FIG. 14) by withdrawing the first palmrest supports 130 into the computer case 131. Palmrest tensioning cable 127 is withdrawn into the case 131 also by a spring or elastomeric band 141. The first palmrest supports 130 may be driven in and out of the case by an electric motor 140 acting through a driving gear (not shown) or through rotation of a worm 128 interacting with a nut 129 attached to the first palmrest supports 130; or may be driven outwardly by a spring (not shown).

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A keyboard for a portable computing device of the type commonly incorporating a processor, a display, and a keyboard, the keyboard capable of automatically deploying from a storage position to an operative position and comprising:

first and second keyboard sections each having a plurality of keys;

a propelling apparatus for driving the first and second keyboard sections from respective storage positions to respective operative positions, the propelling apparatus including a belt that passes in a loop over a drive pulley and an idler pulley forming upper and lower belt portions, the first and second keyboard sections being engaged with opposite portions of the belt such that rotation of the belt in one direction drives the first and second keyboard sections in opposite directions from respective storage positions to respective operative positions and rotation in the opposing direction drives the keyboard sections from respective operative positions to respective storage positions;

a signaling apparatus for communicating signals from the first and second keyboard sections to the processor; and wherein the first and second keyboard sections lie in the same plane when in the respective operative positions and the first and second keyboard sections lie in parallel but different planes when in the respective storage positions.

2. The keyboard of claim 1 wherein the propelling apparatus includes a second belt, with second drive and idler pulleys corresponding to the first belt, with the respective drive pulleys interconnected by an axle such that the belts move synchronously.

3. The keyboard of claim 1 wherein the propelling apparatus comprises a device selected from the group consisting of a spring and an electric motor.

4. The keyboard of claim 1 further comprising a latching apparatus for holding the keyboard in operative position.

5. The keyboard of claim 1 further comprising a carrier having a slot within which the second keyboard section is engaged, the second keyboard section sliding within the slot as the keyboard deploys from storage position to operative position.

6. The keyboard of claim 5 further comprising latching apparatus for holding the keyboard in the operative position, the latching apparatus engaging between the carrier and a stationary component of the portable computing device.

7. A method of deploying a keyboard from a storage position into an operative position comprising:

providing a keyboard including first and second keyboard sections, wherein each section has an operative position and a storage position, the storage positions of the first and second keyboard sections being in different planes;

providing a propelling apparatus for moving the first and second sections in opposite directions from the respective storage positions to the respective operative positions;

in the case of when a portable computing device to which the keyboard is attached is being opened, automatically propelling the first and second sections from the respective storage positions to the respective operative positions; and automatically engaging a latch coupling the first or second section to another component of the keyboard system, thereby retaining the first and second sections in their respective operative positions.

8. The method of claim 7, wherein the propelling apparatus is energized by energy stored within the portable computing device.

9. The method of claim 7, wherein the step of automatically propelling the second section from the storage position to the operative position is initiated upon a catch being released.

10. A keyboard for a portable computing device of the type commonly incorporating a processor, a display and a keyboard system, the keyboard having storage and operative positions and comprising:

first and second keyboard sections each having a respective storage position and a respective operative position, and each keyboard section having a plurality of keys;

a locking mechanism for retaining the movable keyboard sections in the respective operative positions;

a propelling apparatus for deploying the keyboard sections from the respective storage positions to the respective operative positions, the propelling apparatus including a source of mechanical energy sufficient to deploy the keyboard sections and engage the locking mechanism, the propelling apparatus including a belt that passes in a loop over a drive pulley and an idler pulley forming upper and lower belt portions, the first and second keyboard sections being engaged with opposite portions of the belt such that rotation of the belt in one direction drives the respective keyboard sections in opposite directions from the respective storage positions to the respective operative positions and rotation in the opposite direction drives the keyboard sections from the respective operative positions to respective storage positions, and further including apparatus selected from the group consisting of a spring and an electric motor; and signaling apparatus for communicating signals from the keyboard sections to the processor.

11. The keyboard of claim 10, wherein the second section is not in the same plane as the first section when the keyboard is in the storage position.

12. The keyboard of claim 10 further comprising a carrier having a slot within which the second keyboard section is slidably engaged, the second keyboard section sliding within the slot as the keyboard deploys from storage position to operative position.

* * * * *